United States Patent
Joos et al.

[11] Patent Number: 5,109,825
[45] Date of Patent: May 5, 1992

[54] METHOD AND ARRANGEMENT FOR RECOGNIZING MISFIRES

[75] Inventors: Heinz-Günter Joos, Markgröningen; Karl-Heinz Kugler, Vaihingen; Hans Köhnle, Schwieberdingen, all of Fed. Rep. of Germany

[73] Assignee: Robert Bosch GmbH, Stuttgart, Fed. Rep. of Germany

[21] Appl. No.: 671,878

[22] PCT Filed: Oct. 4, 1989

[86] PCT No.: PCT/DE89/00628
§ 371 Date: Apr. 15, 1991
§ 102(e) Date: Apr. 15, 1991

[87] PCT Pub. No.: WO90/04093
PCT Pub. Date: Apr. 19, 1990

[30] Foreign Application Priority Data
Oct. 15, 1988 [DE] Fed. Rep. of Germany ....... 3835285

[51] Int. Cl.$^5$ ............................................. F02M 51/00
[52] U.S. Cl. ............................................. 123/479
[58] Field of Search .............. 123/479, 440, 489, 435, 123/478, 480, 198 D, 425

[56] References Cited
U.S. PATENT DOCUMENTS

| | | | |
|---|---|---|---|
| 5,020,499 | 6/1991 | Kosima et al. | 123/489 |
| 5,048,490 | 9/1991 | Nakaniwa | 123/479 |
| 5,054,452 | 10/1991 | Danz | 123/479 |
| 5,058,551 | 10/1991 | Nakaniwa | 123/425 |

Primary Examiner—Raymond A. Nelli
Attorney, Agent, or Firm—Walter Ottesen

[57] ABSTRACT

An arrangement for recognizing misfires in an internal combustion engine has a sensor (15) for measuring the exhaust-gas pressure and a means (16, 17, 18) for recording the measurement values of the sensor for each clock pulse. Each exhaust-gas pressure measurement value is compared to a corresponding expected value and an occurrence signal is emitted when the two values differ from one another by more than a specified difference. A means (21) for recognizing and treating faults determines the rate of occurrence of the occurrence signals and emits a fault signal when the rate of occurrence determined exceeds a threshold value. A warning lamp lights up on receipt of the fault signal.

This arrangement for recognizing misfires has a simple construction because the ignition in all the cylinders of an internal combustion engine (11) can be simultaneously monitored by means of a single sensor. In addition, it is possible to determine faults in the exhaust-gas line (12) as well as misfires.

11 Claims, 2 Drawing Sheets

METHOD AND ARRANGEMENT FOR RECOGNIZING MISFIRES

FIELD OF THE INVENTION

The invention relates to a method and an arrangement for recognizing misfires in an internal combustion engine.

BACKGROUND OF THE INVENTION

Various methods for recognizing misfires in an internal combustion engine are already known. These include methods which receive the pressure or light signals within various cylinders and supply them to a common control unit for evaluation. Since the corresponding arrangements are complex, they have not, up to now, been installed in series manufactured vehicles.

Particularly in vehicles equipped with a catalyzer, however, it is desirable to continuously monitor for misfires. This is because misfires cause unburnt fuel to reach the catalyzer where it can ignite. This often leads to the catalyzer being burnt out and, in particularly severe cases, to a vehicle fire.

U.S. Pat. No. 3,965,677 discloses a method which detects such faults by monitoring the exhaust-gas pressure signal and, in the case of deviations from an expected variation, takes measures to protect the catalyzer. In this method, the maximum and minimum of the exhaust-gas pressure amplitude are measured within a specified time duration, that is, over a plurality of periods of the exhaust-gas pressure signal. If, after a correction to compensate for intake pipe under pressure effects, the difference of these values lies above a threshold, this is interpreted as an indication of a malfunction and the exhaust gases are then diverted around the catalyzer.

U.S. Pat. No. 3,977,239 discloses a further method which utilizes the periodic fluctuation of the exhaust-gas pressure for purposes of diagnosis. The pressure variation in the exhaust-gas line as a function of time is converted into an electrical signal and subjected to spectral analysis. In addition to a frequency component which is attributable to the ignition frequency, other components can occur which are characteristic of misfires. A comparison of the amplitudes provides a measure of the unevenness of the power strokes.

A similar procedure is disclosed in U.S. Pat. No. 4,189,940. Here, the pressure in the crankcase is measured as a further variable in addition to the pressure signal of the exhaust gas. Both pressure signals are split spectrally into frequency components after conversion into electrical quantities. The amplitudes of these components are then compared for diagnostic purposes.

Common to the three last-mentioned methods is the fact that the pressures are not measured for a single exhaust-gas pressure fluctuation. This represents a defect, for example, if not only the occurrence of a fault but also its localization is desired. For example, the methods mentioned cannot associate a fault in a particular cylinder with this cylinder since the pressures of the exhaust-gas pressure fluctuation associated with a particular ignition are not detected individually.

SUMMARY OF THE INVENTION

It is an object of the invention to provide a method of detecting misfires which is suitable for use in production vehicles and avoids the above-mentioned limitation with respect to diagnostic possibilities. It is also an object of the invention to provide a simply configured arrangement for carrying out the method.

The method according to the invention is a pressure measurement method. It is no longer, however, the combustion pressure in each cylinder which is measured by the pressure in the exhaust-gas line. This introduces two advantages. On the one hand, all the cylinders can be monitored by a single pressure sensor and, on the other hand, it is possible to determine not only faults in the ignition but also faults in the exhaust-gas line. Whether a method realized in practice exhibits both of these advantages depends on the embodiment used. If the exhaust-gas pressure is determined for each cylinder by a separate sensor which is located in the appropriate manifold pipe, the advantage of the particularly simple construction is lost. If the method applied in the particular case does not take account of the fact that a pressure drop can be caused by faulty ignition or by an exhaust-gas line opened at an incorrect position, no use is made of the advantage that these errors can be differentiated.

In order to be able to determine faults, with the method according to the invention, the exhaust-gas pressure is measured with each ignition pulse and compared with an expected value. If the difference between the two values is greater than a specified difference, an occurrence signal is emitted. The rate of occurrence of these signals is determined and whenever a rate of occurrence threshold is exceeded, a signal is emitted indicating a fault. The fault signal can, for example, be used to switch on a warning lamp. It is, however, advantageous by means of embodiments of the method to determine more precisely what is causing the fault signal and, when this has been achieved, a specific fault treatment measure is undertaken.

It is indicated that the rate of occurrence of the occurrence signals, which leads to the emission of a fault signal, is chosen for reasons of expediency. The borderline case appears when the fault signal is emitted immediately on the appearance of an occurrence signal, when the rate of occurrence value with which the comparison is made is, therefore, an occurrence signal on one clock pulse. In most cases, however, it is better to recognize a fault only when a specified number of occurrence signals, for example 10 occurrence signals, is exceeded within a specified larger number of clock pulses, such as within 1,000 clock pulses Two principles can, in particular, be used to check whether an ignition fault or an exhaust-gas line fault is present. The first principle states that whenever a specified rate of occurrence threshold, which is however relatively low, is exceeded, there is an ignition fault in a single cylinder If, on the other hand, the rate of occurrence of occurrence signals is very high, this is either caused by a fault affecting the whole ignition system or the exhaust-gas line is open (that is, it is also open at a position other than just at the end of the exhaust pipe or the exhaust pipes). In this case, a second principle is applied, that is that the variation with time of the exhaust-gas pressure has a different appearance in the case of a misfire compared with the case of an open exhaust-gas line. The actual variation is therefore compared to a pregiven variation and, depending on the result of the comparison, a fault signal appropriate to this result is emitted.

If not only a check is made on whether the exhaust-gas pressure measured value is below the expected value by a specified difference but, in addition, a check is made on whether the measured value is above the expected value by more than another specified difference, it is also possible to check whether the exhaust-gas line is blocked.

The arrangement according to the invention has means for carrying out the method steps mentioned above. The arrangement is advantageously realized by means of a correspondingly programmed microprocessor.

BRIEF DESCRIPTION OF THE DRAWINGS

The invention is explained in more detail below using an illustrative example shown in figures. In these.

DESCRIPTION OF PREFERRED EMBODIMENTS OF THE INVENTION

Figure 1:
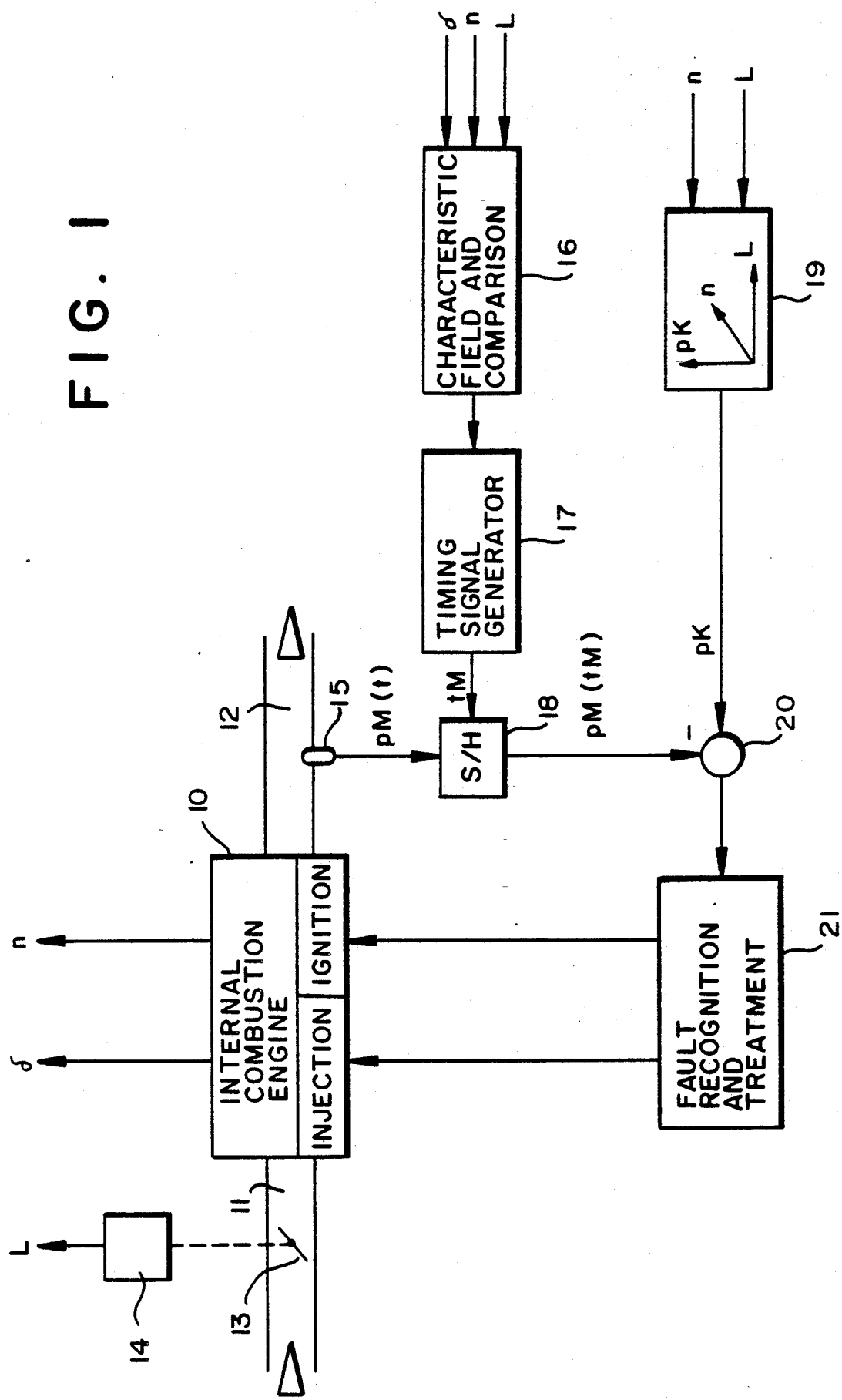
FIG. 1 shows a block diagram of an arrangement according to the invention in an internal combustion engine; and, FIG. 2 shows a flow diagram to explain the procedure of a preferred method for recognizing misfires.

The arrangement for recognizing misfires according to the block circuit diagram of FIG. 1 monitors an internal combustion engine 10, which is diagrammatically represented in FIG. 1 without distinguishing individual cylinders. The intake line 11 and the exhaust line 12 are each shown only as a simple pipe without the branches into the cylinders or out of the cylinders. A throttle flap 13, whose position is recorded by any desired design of angular measuring device 14, is located in the intake line 11. The position of the throttle flap is an indication of the load L under which the internal combustion engine 10 is operated. The load signal can also be gained by other known means. A pressure sensor 15, which emits a pressure signal pM (p) is located in the exhaust-gas line 12. The crank angle δ and the rotational speed n are included in FIG. 1 as signals, which are additionally processed by the arrangement for recognizing misfires.

In each cylinder of the internal combustion engine, the associated exhaust-valve arrangement opens at a definite crank angle δ. Because of the cam shape, the opening occurs slowly initially and then accelerates. The quantity of exhaust gas expelled into the exhaust-gas line increases correspondingly: first slowly, then more rapidly and finally falling again. The maximum of the exhaust-gas flow at the outlet location has, as a rule, already been reached before the exhaust-valve arrangement has fully opened. The exhaust-gas flow changing with time at the location of the exhaust-valve arrangement is associated with a pressure which changes with time. It should be noted that the pressure and the exhaust gas propagate at different velocities. The pressure, in fact, propagates at sonic velocity whereas the exhaust gas expelled moves forward at a certain flow velocity. The propagation of the pressure is the essential feature in what follows. From the exhaust-valve arrangement to the pressure sensor 15, the pressure signal requires a time which corresponds to the product of sonic velocity and distance between exhaust-valve arrangement and pressure sensor. The crank angle δ at which the pressure at the exhaust-valve arrangement is a maximum is known with relative accuracy for different values of the rotational speed n and the load L. Since the time the pressure signal requires from a particular exhaust-valve arrangement to the pressure sensor is also known, the times are accurately known at which the maximum pressure due to a certain cylinder occurs at the pressure sensor 15, referred in each case to the crank angle mentioned above. Ideally, the measured value from the pressure sensor should be recorded at exactly this time.

In order to make this possible, a measurement angle characteristic field 16, a timing signal generator 17 and a scan/hold switch 18 are shown in the flow diagram according to FIG. 1. The measured angle characteristic field 16 is continuously supplied with the current values of the crank angle δ, the rotational speed n and the load L. The crank angle at which the exhaust-gas pressure is a maximum at the exhaust-valve arrangement is read from the characteristic field 16 as a function of the values of the rotational speed n and the load L. As soon as the actual crank angle δ agrees with this crank angle δM for the maximum exhaust-gas pressure, a trigger signal is emitted to the timing signal generator 17. The timing signal generator has previously been set to a time span which corresponds to the delay period mentioned above between the exhaust-gas valve arrangement and the pressure sensor, the exhaust-gas arrangement being at the particular cylinder for which specifically the pressure has to be measured. When the time span set has elapsed, this indicates that the measurement time tM has been reached. The scan/hold switch 18 records the current exhaust-gas pressure pM (tM) on receiving a corresponding trigger signal from the timing signal generator 17.

The measurement value which the pressure sensor 15 should indicate when the whole arrangement is functioning correctly is known as a function of the particular current values of the rotational speed n and the load L. This expected exhaust-gas pressure pK is read from an exhaust-gas pressure characteristic field 19 and the exhaust-gas pressure measurement value pM (tM) is subtracted from this value in a comparison point 20. The difference is supplied to a means 21 for fault recognition and fault treatment. This means analyzes the difference signal and determines, following a procedure described further below, whether there is a fault in the fuel metering or the ignition. Different actions are taken depending on the result of the investigation.

It is noted again that the various block circuit diagram components according to FIG. 1 are preferably realized by means of a programmed microprocessor.

Figure 2:
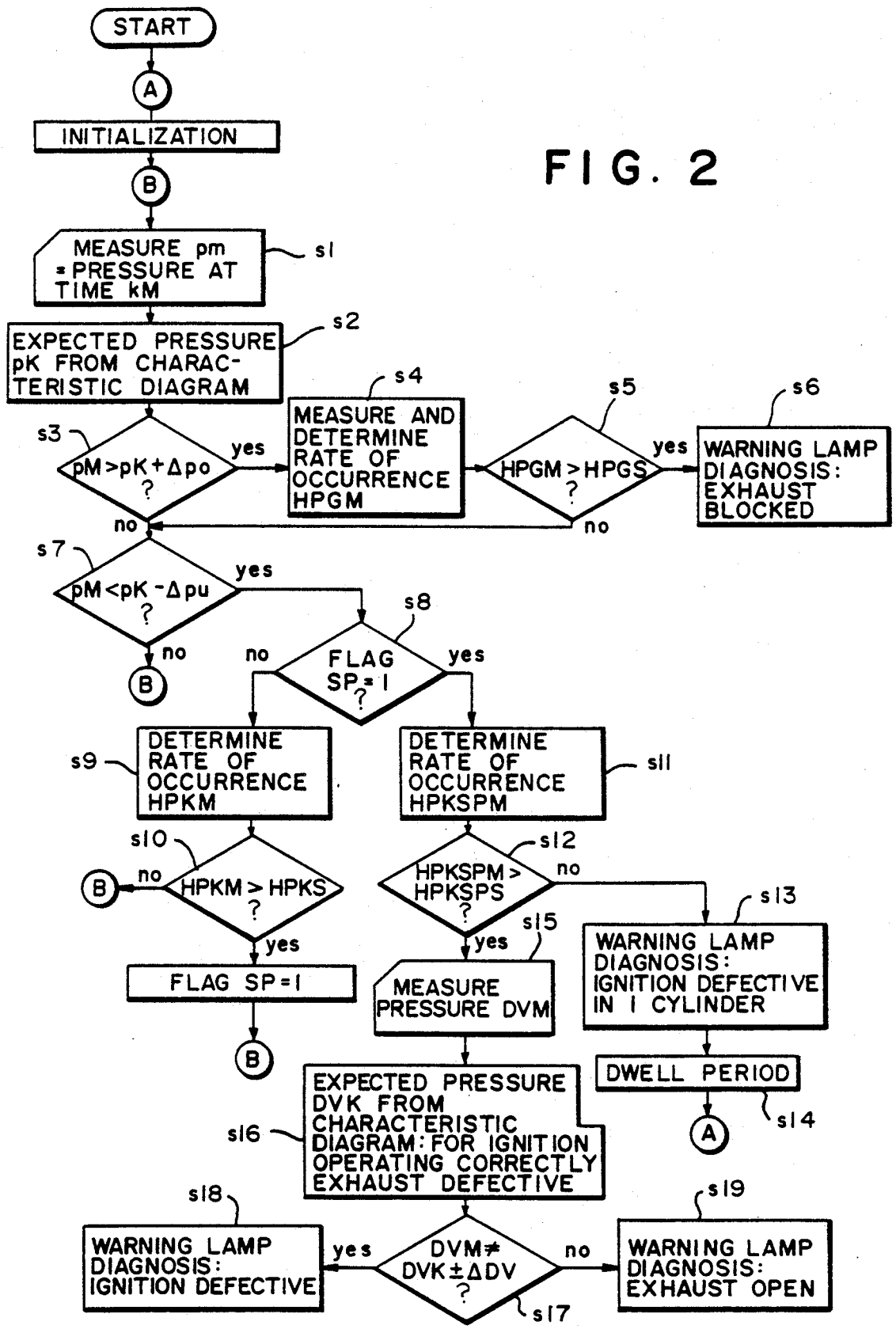

The method roughly described above in association with the arrangement according to FIG. 1 is now explained in more detail using the flow diagram of FIG. 2.

After the method has started, an initialization of various values is undertaken between two marks A and B. The exhaust-gas pressure pM at the measurement time tM is recorded in a step s1. The way in which the time tM is determined has been explained above using FIG. 1. In a step s2, the expected exhaust-gas pressure pK is read from the characteristic field 19, again explained in more detail above. Whether the exhaust-gas pressure measurement value pM exceeds the exhaust-gas pressure expected value pK by more than a specified difference Δpo is checked in a step s3, that is a check is made to see whether the exhaust-gas line is blocked. If the answer to the question investigated is in the positive, this corresponds to the emission of a pressure rise signal. In a step s4, it is then checked how often such a pressure rise signal occurred within a specified number of clock pulses. This is the measured rate of occurrence HPGM. The measured rate of occurrence HPGM is compared to a threshold rate of occurrence HPGS in a step s5. If the required rate of occurrence has been reached or exceeded, a step s6 ensures that a warning lamp lights up and a diagnosis element, which shows that the exhaust-gas line is blocked, is stored.

If, on the other hand, the threshold rate of occurrence is not attained, a step s7 follows which is also reached immediately after the step s3 whenever the question investigated of a blocked exhaust-gas line receives a negative answer in step s3. In step s7, it is investigated whether the exhaust gas measurement value pK is less than the exhaust-gas pressure expected value pK by more than a specified difference $\Delta$pu. If the question investigated receives a negative answer, the method returns to the mark B.

If, on the other hand, the question investigated in the step s7 receives a positive answer, this indicates that the measured exhaust-gas pressure is unexpectedly low. This can be due to the fact that the ignition has failed or that the exhaust-gas line is open. Preparations are made for deciding between these cases by investigating, in a step s8, whether a flag SP has been set. This flag is not initially set because it was initialized between the marks A and B. If it is not set, a step s9 follows in which a rate of occurrence HPKM is measured. The measured rate of occurrence HPKM is compared to a threshold rate of occurrence HPKS in a step s10.

If, on the other hand, it is found in step s8 that the flag SP is set, a rate of occurrence HPKSPM is measured in a step s11 and this frequency is compared to a threshold rate of occurrence HPKSPS in a following step s12.

The following comment is made with respect to the rates of occurrence HPGM of step s4, HPKM of step s9 and HPKSPM of step s11 and with respect to the threshold rates of occurrence HPGS of step s5, HPKS of step s10 and HPKSPS of step s12. Each of these concerns a number of measured occurrence signals within a specified clock count. An occurrence signal is either a positive answer to the question in step s3 (pressure rise signal) or a positive answer to the question in step s7 (pressure drop signal). In the case of a fault in the exhaust-gas line, whether it is due to blockage or an undesired opening, occurrence signals will occur at practically every clock pulse. Occurrence signals occur much more rarely, however, if it is only the ignition in one cylinder which fails. These different facts have to be taken into account when deciding how the rates of occurrence are determined and how the associated threshold values are determined. If the failure of the ignition of an individual cylinder has to be checked, a relatively large number of clock pulses must be checked because misfires sometimes occur in unsteady transitions without there being a fault in the ignition system. In the illustrated embodiment, the rate of occurrence HPKM is determined by monitoring how many pressure drop signals occur in 1,000 clock pulses. This is carried out by first determining by means of a counter how many pressure drop signals occur within 100 clock pulses. This counter is reset after each 100 clock pulses and a tenth of the value of the count result is added to a total of which 9/10 is taken into account. 9/10 of this new total is again taken into account during the next addition. In this way, the results from the last 1,000 clock pulses are always taken into account. The rate of occurrence HPKM determined in this way is compared with a threshold rate of occurrence HPKS which has the value 10 at medium loads and medium rotational speeds. The other rate of occurrence values HPGM and HPKSPM, which are used to determine faults which are not caused by misfires in an individual cylinder, are referred to only 100 clock pulses in the preferred illustrated embodiment. The threshold rate of occurrence HPGS for the case of unexpectedly high pressures is 50 signals per 100 clock pulses. The threshold rate of occurrence HPKSPS is selected such that the ratio of pressure drop signals to clock pulse signals is somewhat higher than the ratio of one cylinder to the total number of cylinders. In the case of a four cylinder engine, for which this ratio is thus 1:4, the selected threshold rate of occurrence is 30 pressure drop signals per 100 clock pulses.

As mentioned above, in step s10 it is checked whether the rate of occurrence HPKM reaches or exceeds the threshold rate of occurrence HPKS. If this is not the case, the method returns to the mark B. If, on the other hand, this is the case, the flag SP mentioned is set, whereupon the process also returns to the mark B. If the step s8 is then reached again, the method branches to the step s11 because the flag SP is now set. In the step s12 it is investigated whether the rate of occurrence HPKSPM reaches or exceeds the threshold rate of occurrence HPKSPS.

The reason for the sequence of steps mentioned in the previous paragraph is as follows. If it is found, in step s10, that the threshold rate of occurrence HPKS is reached or exceeded, it is still not clear whether faults have occurred with an evenly distributed rate of occurrence over the particular last 100 clock pulses investigated or whether the error rate of occurrence was very high in the most recent clock pulses. If the ignition in an individual cylinder fails occasionally, 11 pressure drop signals, for example, are determined gradually during the 1,000 last clock pulses checked. If, on the other hand, no pressure drop signal has occurred during 989 clock pulses and then 11 in series, this indicates that it is not the ignition of an individual cylinder which is defective. These cases are distinguished by means of the steps s11 and s12.

If, in step s12, it is found that the rate of occurrence HPKSPM is less than the threshold rate of occurrence HPKSPS, this indicates that it is only the ignition of an individual cylinder which is operating incorrectly. In a following step s13, a warning lamp is lighted and an associated diagnosis signal is stored. In addition, fault measures are undertaken.

In the preferred illustrative example, the fault rate of occurrence is not simply determined in common for all the cylinders but, rather, the measured values are evaluated for each individual cylinder. This does not involve any problems because it is necessary in any case, when triggering the pressure sensor 15, to ensure that this always occurs when the pressure amplitude of a pressure wave from one of the cylinders passes through. The main fault measure in step s13 consists in switching off the injection to the cylinder subject to the fault. This is done to ensure that unburnt fuel does not continue to reach the catalyzer. After a waiting period has elapsed, the injection is resumed, in a step s14, also to the cylinder subject to the fault, however, with the ignition energy simultaneously being increased for this cylinder. The method then returns to the mark A. If it is found that the fault is not corrected by increasing the ignition dwell period, the injection to the cylinder subject to the fault is switched off permanently. If, on the other hand, it is found that the fault is no longer present, the system will be switched to normal operation again after a waiting period has again elapsed. If the fault then recurs, the increased ignition dwell period is then permanently switched on. In every case, the warning lamp remains permanently lighted. If, however, it is found that no further fault occurs, the warning lamp is turned off and the diagnosis signal is cancelled.

It should be noted that the fault measures concerning the ignition dwell period and the setting of the injection can also be used only individually or in reverse order.

If, in step s12, it is found that the rate of occurrence HPKSPM is greater than the threshold rate of occurrence HPKSPS, this indicates that it is not only the ignition for an individual cylinder which is faulty but that very frequent pressure drop signals are occurring; these can be caused either by faults in the whole ignition system or by an open exhaust-gas line. In order to distinguish ignition faults from exhaust-gas line faults, a plurality of exhaust-gas pressure measurements is undertaken in a step s15, three measurements in the case of the illustrative example. The middle measurement takes place at the time tM explained with respect to FIG. 1 and step s1. The first measurement takes place at a specified time span before this and the second measurement at a specified time span thereafter. In step s16, expected pressure values DKK are determined as they would appear if the ignition were operating correctly but the exhaust-gas line were open. The expected pressure values can be again read from a characteristic field, as has been explained above for the individual exhaust-gas pressure expected values using FIG. 1 and step s2. In the preferred illustrative example, however, a different procedure is adopted. The exhaust-gas pressure measured value determined from the middle measurement is used as the initial value in step s15. With the aid of this value, the expected values as expected for the first and third measurement times are calculated. If there is an exhaust line fault, these pressures, when referred to the maximum pressure, are substantially lower than in the case of an ignition fault.

The measured pressure variation is compared to the expected pressure variation in a step s17. In the illustrative example, this is done by comparing the measured pressure variation values DVM from the first and third measurement with the associated expected values DVK. If the comparison values for both pairs of values agree with one another within specified limits +/− ΔDV, this indicates that the ignition is defective. In this case, the warning lamp is lighted and a diagnosis signal stored in a step s18. No particular fault measures are undertaken because, generally speaking, the vehicle is no longer capable of functioning when the ignition has failed extensively.

If, on the other hand, the question investigated in step s17 receives a negative answer, the warning lamp is again lighted in a step s19 but the diagnosis signal that the exhaust-gas line is open at an undesired position is emitted. No fault measures are undertaken because the only sensible measure is to close the undesired opening and this measure cannot be undertaken automatically.

It should be noted that standing waves occur in the exhaust-gas line under certain operating conditions and these continue even if the ignition fails in one of the cylinders. In this case, the failure of the ignition cannot be determined. It is therefore desirable to stop the rate of occurrence measurement under operating conditions for which it is known that the signal from the pressure sensor only provides an inaccurate indication of the faults investigated. In this case, no count is made of the number of clock pulses or the number of fault signals which may occur. Operating conditions for which such a procedure is adopted are appropriately stored in a characteristic field. Whenever characteristic field values are satisfied, the rate of occurrence measurement ceases.

It should be noted that those values which are obtained from characteristic fields according to the above description of the preferred illustrative example can also be determined by mathematical calculation. This does, however, require increased computation time.

The sensor for the pressure measurement is preferably a piezo-electrical sensor, that is a sensor as has also been used up to now for measuring the pressure within a cylinder.

We claim:

1. A method for recognizing misfires in an internal combustion engine, the method comprising the steps of:
   determining the maximum exhaust-gas pressure for each exhaust stroke;
   determining an exhaust-gas pressure expected value for each exhaust stroke from values of operating parameters of the engine;
   comparing the maximum exhaust-gas pressure to the corresponding exhaust-gas pressure expected value and emitting an occurrence signal whenever the two values deviate from one another by more than a specified difference;
   determining the rate of occurrence of the occurrence signals; and,
   whenever the rate of occurrence exceeds a threshold value, either directly emitting a fault signal or determining further rates of occurrence which then lead to the emission of a specified fault signal.

2. The method of claim 1, wherein the occurrence signal is emitted as a pressure drop signal when the measurement value is less than the expected value by more than a specified difference.

3. The method of claim 2, wherein the fault signal is a misfire fault signal.

4. The method of claim 2, comprising the further steps of:
   emitting a misfire fault signal when a further rate of occurrence remains below a threshold value; but,
   when the further rate of occurrence exceeds the threshold value, emitting an ignition-defect/exhaust-gas lien fault signal.

5. The method of claim 4, comprising the further steps in response to the ignition-defect/exhaust-gas line fault signal:
   determining the actual exhaust-gas pressure variation for at least one clock pulse;
   comparing each determined variation with an expected exhaust-gas pressure variation; and,
   emitting an exhaust-gas line open signal whenever the comparison result shows that the variation measured corresponds substantially to an expected variation such as is present with correct ignition but open exhaust-gas line; but,
   emitting an ignition-defect signal whenever the comparison result shows that the measured variation corresponds substantially to an expected variation such as is present with defective ignition but correctly operating exhaust-gas line.

6. The method of claim 1, comprising the further steps of:
   emitting a pressure rise signal whenever the exhaust-gas pressure measurement value exceeds the expected value by more than a specified difference;

determining the rate of occurrence of the pressure rise signal; and, whenever the rate of occurrence determined exceeds a threshold value, emitting an exhaust-gas line closed signal.

7. The method of claim 1, wherein the internal combustion engine is provided with sequential injection and the method is carried out for the cylinders individually in addition to all the cylinders in common.

8. The method of claim 7, wherein the injection for the cylinder subject to the fault is switched off in response to the misfire fault signal obtained from an individual cylinder identification method.

9. The method of claim 1, wherein the ignition energy is increased in response to the misfire fault signal or the ignition defect fault signal.

10. An arrangement for detecting misfires in an internal combustion engine, the arrangement comprising:

sensor means for measuring the exhaust-gas pressure;

means for detecting the maximum exhaust-gas pressure of for each exhaust stroke;

means for determining an exhaust-gas pressure expected value from values of operating parameters for each exhaust stroke;

means for comparing each exhaust-gas pressure measurement value with the corresponding expected value and for emitting an occurrence signal when the two values deviate from one another by more than a specified difference;

means for determining the rate of occurrence of the occurrence signals; and, means for emitting a fault signal when the determined rate of occurrence exceeds a threshold value.

11. Arrangement of claim 10, further comprising:

means for detecting the variation of pressure during exhaust strokes;

means for determining an exhaust-gas pressure expected value variation from values of operating parameters for exhaust strokes and for comparing these variations with measured pressure variations for this stroke; and, means for supplying fault signals in dependence upon the result of the comparison of the measured pressure variations with the expected variation.

* * * * *

UNITED STATES PATENT AND TRADEMARK OFFICE
CERTIFICATE OF CORRECTION

PATENT NO. : 5,109,825

DATED : May 5, 1992

INVENTOR(S) : Heinz-Günter Joos, Karl-Heinz Kugler and Hans Köhnle

It is certified that error appears in the above-identified patent and that said Letters Patent is hereby corrected as shown below:

On the title page, under "References Cited": delete "5,054,452 10/1991 Danz ............... 123/479" and substitute therefor
-- 5,054,452 10/1991 Denz ............ 123/479 --.

In column 2, line 48: after "pulses", insert -- . --.

In column 2, line 54: after "cylinder", insert -- . --.

In column 8, line 46: delete "lien" and substitute -- line -- therefor.

In column 9, line 24: delete "of".

Signed and Sealed this

Ninth Day of November, 1993

Attest:

BRUCE LEHMAN

Attesting Officer

Commissioner of Patents and Trademarks